United States Patent
Blaylock

(10) Patent No.: US 10,132,190 B2
(45) Date of Patent: Nov. 20, 2018

(54) TURBOCHARGER WITH PROGRESSIVELY VARIABLE A/R RATIO

(71) Applicant: Jimmy L. Blaylock, Baxter Springs, KS (US)

(72) Inventor: Jimmy L. Blaylock, Baxter Springs, KS (US)

(*) Notice: Subject to any disclaimer, the term of this patent is extended or adjusted under 35 U.S.C. 154(b) by 391 days.

(21) Appl. No.: 14/890,381

(22) PCT Filed: May 23, 2014

(86) PCT No.: PCT/US2014/039362
§ 371 (c)(1),
(2) Date: Nov. 10, 2015

(87) PCT Pub. No.: WO2014/190272
PCT Pub. Date: Nov. 27, 2014

(65) Prior Publication Data
US 2016/0090857 A1    Mar. 31, 2016

Related U.S. Application Data

(60) Provisional application No. 61/827,039, filed on May 24, 2013, provisional application No. 61/844,974, filed on Jul. 11, 2013.

(51) Int. Cl.
*F01D 17/14* (2006.01)
*F02D 23/00* (2006.01)
(Continued)

(52) U.S. Cl.
CPC .......... *F01D 17/141* (2013.01); *F01D 9/02* (2013.01); *F01D 9/026* (2013.01); *F01D 17/143* (2013.01);
(Continued)

(58) Field of Classification Search
CPC .... F01D 17/146; F01D 17/143; F01D 17/141; F01D 17/12; F01D 17/14; F01D 17/145;
(Continued)

(56) References Cited

U.S. PATENT DOCUMENTS

3,190,068 A    6/1965    Williams et al.
3,313,518 A *  4/1967    Nancarrow ............. F01D 17/12
                                                        415/13
(Continued)

FOREIGN PATENT DOCUMENTS

DE    3105179        9/1982
JP    S6065207 A     4/1985
JP    S60261904 A    12/1985

OTHER PUBLICATIONS

Steve Sturgess, Could SuperTurbocharger Become the Hero on Fuel Economy?, Street Smarts, Diesel Progress, North American Edition, Sep. 2010.
(Continued)

*Primary Examiner* — Richard Edgar
*Assistant Examiner* — Danielle M Christensen
(74) *Attorney, Agent, or Firm* — Gable Gotwals

(57) ABSTRACT

An improvement to a turbocharger having a housing (10) with a slot (25) located along a mid-line of the housing (10) above the turbine wheel (29) and a tongue (15) defining the end of an initial inlet throat area (11) of the housing (10), the slot (25) permitting inlet exhaust gas which flows past the tongue (15) to flow into the turbine wheel (29), the improvement being a pivoting vane (50) aligned with the slot (25) and having an upstream end (55) located at a downstream end (57) of the tongue (15). When the vane (50) is in its fully closed position (60), the inlet exhaust gas is prevented from flowing into the slot (25) and, therefore, the turbine wheel (29), until the inlet exhaust gas passes the downstream end (57) of the vane (50). The vane (50) effectively extends the
(Continued)

tongue (15) to define a revised inlet throat area (12). The A/R ratio of the housing (10) progressively varies as the vane (50) pivots between the fully opened (70) and fully closed (60) positions.

13 Claims, 9 Drawing Sheets

(51) Int. Cl.
    *F01D 9/02* (2006.01)
    *F01D 25/24* (2006.01)
    *F02B 37/24* (2006.01)

(52) U.S. Cl.
    CPC ......... *F01D 17/145* (2013.01); *F01D 17/146* (2013.01); *F01D 25/24* (2013.01); *F02B 37/24* (2013.01); *F02D 23/00* (2013.01); *F05D 2220/40* (2013.01); *Y02T 10/144* (2013.01)

(58) Field of Classification Search
    CPC .... F02B 37/24; F04D 27/002; F04D 29/4293; F04D 5/007; F04D 15/0022; F04D 15/0038; F02C 6/12
    See application file for complete search history.

(56) References Cited

U.S. PATENT DOCUMENTS

| | | | |
|---|---|---|---|
| 3,363,412 | A | 1/1968 | Fischer et al. |
| 3,396,534 | A | 8/1968 | Bernson et al. |
| 4,177,005 | A | 4/1979 | Bozung et al. |
| 4,512,714 | A * | 4/1985 | Kaesser ................ F01D 17/146 415/151 |
| 4,678,397 | A | 7/1987 | Komatsu et al. |
| 7,481,056 | B2 | 1/2009 | Blaylock et al. |
| 2006/0230759 | A1 | 10/2006 | Semrau |
| 2010/0266390 | A1 | 10/2010 | Henderson et al. |
| 2011/0052374 | A1 | 3/2011 | Arnold |
| 2012/0036849 | A1 | 2/2012 | Watson et al. |

OTHER PUBLICATIONS

Jay K. Miller, Turbo: Real World High Performance Turbocharger Systems 45, CarTech 2008.

* cited by examiner

TURBOCHARGER WITH PROGRESSIVELY VARIABLE A/R RATIO

CROSS-REFERENCE TO RELATED APPLICATIONS

This United States application is the National Phase of PCT Application No. PCT/US2014/039362 filed May 23, 2014, which claims priority to U.S. Provisional Patent Application No. 61/827,039 filed May 24, 2013 and U.S. Provisional Patent Application No. 61/844,974 filed Jun. 11, 2013, each of which is incorporated herein by reference.

BACKGROUND OF THE INVENTION

This invention relates generally to turbochargers for motor vehicles and, more specifically, to means for progressively varying the A/R (Area/Radius) ratio of a turbocharger.

Turbochargers are well known devices used in all forms of vehicles for supplying air to the intake of an internal combustion engine at pressures above atmospheric pressure ("boost pressures"). A conventional turbocharger includes a turbine rotor or wheel with a plurality of fins or blades inside a volute turbine housing. The turbine rotor is rotated by exhaust gases from the engine which impinge upon the turbine blades. The rotor, via a connecting shaft, provides the driving torque to a compressor. Ambient air fed to the compressor creates a boost pressure that is fed to the intake manifold of the engine.

The flow capacity of the exhaust turbine is a function of the housing volute areas and the passage of the exhaust gases as it strikes the turbine blades. The flow of exhaust gas has to be regulated to control the compressor speed to create the desired boost in manifold pressure. A typical centrifugal compressor includes an impeller driven at high speed by the turbine rotor. A diffuser surrounding the impeller causes the ambient air to increase in pressure which is directed to the intake manifold.

One particular goal with any turbocharger is the need for a quick response, i.e., prevent "turbo lag," a delay between the time when high power output is first demanded of the engine by setting the throttle to a wide open position and the time when a boost in the inlet manifold air pressure is delivered by the compressor. In some instances turbo lag could result in a dangerous driving situation when substantially instantaneous response is desired. If the turbocharger is large enough to provide the maximum horsepower for an internal combustion engine, then it will have excessive and potentially unsafe lag when the throttle is increased. If the turbocharger is reduced in size to minimize turbo lag, then efficiency is lost at higher engine rpms.

Some early turbocharger designs sought to solve the problem of turbo lag within a certain range of low engine speeds, such as when the engine is idling, by adding a regulated air supply to increase the mass of air entering the turbocharger intake and being forced into the engine manifold. At idle speed, the engine exhaust is insufficient to maintain the speed and charging-air output of the compressor section of the turbocharger, causing the turbocharger to "lag behind" the engine in performance. To maintain the speed of the turbocharger, a pair of nozzles penetrates the housing in opposite directions and injects air generally tangentially to the outer tips of the rotor blades. The air pressure provided by the nozzles acts as a "jet assist" in the turbocharger compressor when the engine is at idling speed (see U.S. Pat. No. 3,190,068 to Williams et al., Turbocharger for Compressor Driving Engine, issued Jun. 22, 1965, and U.S. Pat. No. 3,363,412, to Fischer et al., System for Maintaining Turbocharger Compressor Speed, issued Jan. 16, 1968). Another design positions nozzles at preselected points about the turbine rotor and directs air through the nozzles to impinge the blades and, in addition to providing a jet assist, prevent resonant vibration conditions in the rotor for its entire rotational speed range (see U.S. Pat. No. 3,396,534 to Bernson et al., Air Impingement Nozzle Arrangement for a Turbocharger Compressor and an Improved Method of Employing Air Impingement, issued Aug. 13, 1968).

The air-assisted designs do not operate to minimize turbo lag when the turbocharger is already in a spun-up condition and the engine is at normal operating speed but requires additional horsepower. Furthermore, the air-assisted designs require a waste gate to handle the total exhaust flow at maximum horsepower.

Other designs have proposed variable volute turbines; variable geometry turbines; electrically driven turbines; moveable or pivoting vanes, gates and walls for guiding, dividing, or changing the direction the exhaust gases relative to the turbine rotor and thereby control its rotational speed.

Variable volute turbines make use of a sliding or flexible dividing wall to change the geometry of the volute and, therefore, the flow of exhaust gas into the turbine wheel One example of a variable volute design is U.S. Pat. No. 4,177,005 to Bozung. The design can be slow in responding to sudden changes, is used solely as a braking application, and its performance can be negatively affected by debris build-up on the sliding wall surfaces. Another example is US 2011/0052374 to Arnold. This design makes use of a flexible dividing wall that moves along a path to vary the discharge area into the turbine wheel. The design is complicated and failure-prone because the chain and bearing mechanism used to move the wall are in the path of the hot exhaust flow.

Variable geometry turbochargers use adjustable guide vanes arranged about the turbine wheel in order to control exhaust gas flow to the wheel. These designs require a large number of expensive components along with sophisticated software and controls.

Electrically driven turbines essentially turn the shaft of the turbine rotor into an armature. Because the armature must be disengaged once the turbine rotor spins up to a certain speed, these designs entail complicated electro-mechanical structures.

A moveable wall design for a variable geometry turbocharger is disclosed in US 2012/0036849A1 to Watson et al. ("the Watson publication"). A pivoting wall located along the upper wall of the housing pivots about a point located upstream of the housing tongue and near the entry to the housing (compare U.S. 2010/0266390 to Henderson et al. showing a pivoting wall located far downstream of the tongue). As the wall pivots away from the upper wall, the wall reduces the volume of exhaust gas flowing into the volute. Alternatively, a rotating wedge segment can be located along the upper wall of the housing and moved downstream to alter the cross section of the volute. However, neither the wall nor the wedge can prevent exhaust air from flowing into the turbine wheel even when fully closed or deployed, nor can either one alter or extend the end of the housing tongue. Additionally, an equal amount of exhaust cannot flow over and under of the pivoting wall or wedge because there is no neutral position.

A moveable or variable vane design, which is intended to minimize the occurrence of turbo lag, is described in U.S. Pat. No. 7,481,056 to Blaylock et al., Turbocharger with Adjustable Throat, issued Jan. 27, 2009 ("Blaylock"). A flow control gate is positioned in the center of the inlet to the housing on the exhaust side of the turbocharger and adapted, from a command, to momentarily rotate or pivot downstream about a transverse hinge from a neutral first position to a second position toward the blades of the turbine rotor. (There is no open position above the neutral position.) In the second position, the control gate reduces the volume of exhaust gas flowing along an inner flow path toward the turbine rotor and increases the air velocity and pressure upon the turbine rotor. This causes the turbocharger to reach optimal operating speed to substantially reduce or eliminate harmful emissions while increasing initial engine takeoff power and reducing lag time from when speedup was first signaled by the operator. Once the turbine is spun up, the control gate returns to a neutral position. When in the neutral position, the operation of the turbocharger is as a standard turbocharger. The typical time for the gate action is a very small part of a second before returning to the neutral position. A properly sized turbocharger could eliminate the need for a waste gate and the turbocharger could be large enough to handle the total exhaust flow at maximum horsepower.

Still others have mechanically coupled the turbocharger to the engine. This type of arrangement, called "turbocompounding," is described in the September 2010, North American edition of the trade magazine, Diesel Progress (see "Could SuperTurbocharger Become the Hero on Fuel Economy?"). The turbocharger adds a small additional horsepower boost through the combination of the turbocharger and its transmission. However, turbocompounding entails complexity and involves additional production cost all in hopes of achieving at most a 7% fuel savings on diesel engines.

A flow control gate which momentarily alters the A/R (Area/Radius) ratio of a turbocharger in order to eliminate turbo lag is desirable (compare DE 31 05 179 A1 which discloses a gate that lies along the outer wall of the housing and outside the inlet or throat section and, therefore, cannot alter the A/R ratio of the housing). It is well known in the art that the A/R ratio is the inlet cross sectional area dived by the radius from the turbo centerline to the centroid of that area. The inlet (or throat section) of a turbocharger extends between the end of the housing which mounts to the exhaust manifold and the tip or end of the tongue of the housing. To calculate the A/R ratio, the area of the turbine housing is measured in square inches of a cutting plane line that passes through the turbine's gas passage at the tip of the tongue, divided by the radius from the center of the turbine wheel's axis of rotation, to the centroid of the volute. The tongue tip is the entry point of the turbine housing where exhaust gas flow begins to reach the turbine wheel inducer.

(see Jay K. Miller, *Turbo: Real World High Performance Turbocharger Systems* 45 (CarTech 2008)).

From the above, it is clear that:
1. The "A" in the A/R ratio is determined by the cross-sectional area defined by a cutting plane line that passes through the turbine's gas passage at the tip of the tongue to the opposing wall of the inlet channel;
2. The inlet area A can be changed by making a new housing with a different sized area A; and
3. The throat or inlet extends to the end of the tongue but not beyond it.

The ability to alter the area of the inlet is important. For example, reducing the throat cross-section results in higher boost pressures. Turbocharger housings are designed with different A/R ratios along with complicated means (e.g., variable geometry turbines) to achieve the desired performance. Other than Blaylock's flow control gate which attempts to adjust the throat, the A/R ratio in prior art pivoting vane designs remains fixed because, absent making a new housing, there is no way for those designs to alter either the throat area or the radius from the center of the turbine wheel. However, Blaylock cannot alter where the tongue tip or tongue end of the housing begins and ends in real time and, because of the location of the pivot point (at about the center of the vane), cannot close flow completely.

SUMMARY OF THE INVENTION

An improvement to a turbocharger having a housing with a slot located along a midline of the housing and above the turbine wheel and a tongue defining the end of an inlet throat area of the housing, the slot permitting inlet exhaust gas which flows past the tongue to flow into the turbine wheel, the improvement being a pivoting vane of fixed length aligned with the slot and located at a downstream end of the tongue. When the vane is in its fully closed position, the inlet exhaust gas is prevented from flowing into the slot and, therefore, the turbine wheel, until the inlet exhaust gas passes the end of the vane. The Preferably, the vane is arranged such that exhaust gas flow passing over the downstream end of the vane is prevented from passing between the vane and where it meets the downstream end of the tongue.

The A/R ratio of the housing progressively varies as the vane pivots between the fully opened and fully closed positions. When the vane is in the fully opened position, the initial (first) inlet throat area remains unaltered and, therefore, so does the A/R ratio of the housing. When the vane is in the fully closed position, the inlet throat area changes to a revised (second) inlet throat area having a reduced cross-sectional area. The A/R ratio changes. When the vane is in the fully closed position, the end of the vane extends to 180° of the slot. However, the length of the vane can be any length that provides a desired A/R ratio when the vane is in the fully closed position yet still clear the turbine wheel when moving into the fully opened position, with shorter lengths being less effective than longer lengths.

The vane can further include a vertical divider wall located above and attached to the vane. When the vane is in the fully closed position, the vertical divider wall defines a first and a second volute of the housing. A vertical divider wall may also be located in the inlet throat area of the housing, upstream of an upstream end of the vane.

One preferred embodiment of a turbocharger with a variable A/R ratio made according to this invention includes a moveable divider with a volute slot blocker or vane attached to it. In the open position, the moveable divider opens the housing to its original A/R ratio. As the moveable divider pivots towards the closed position, a volute slot blocker or vane connected to the bottom of the divider changes its position relative to the tongue tip or tongue end, thereby progressively varying the A/R ratio. In the closed position, the upstream end of the vane meets the tongue end of the housing. A reduced A/R ratio results. Movement between the open and closed positions can be controlled via electrical or pneumatic control means.

In another preferred embodiment, the moveable divider is eliminated and the volute slot blocker or vane, which lies at the downstream end of the tongue end, pivots between the open and closed position. The volute slot blocker can be controlled either electrically or pneumatically.

The objectives of this invention are to provide a turbocharger design that (1) is simple in its design and control; (2) can be retrofitted to existing turbocharger designs; (3) "spins up" the turbine wheel quickly; (4) progressively varies the A/R ratio; (5) does not create turbulence when varying the A/R ratio; (6) does not create backpressure in the inlet throat area; and (7) eliminates the need for a waste gate and other complicated structures intended to control back pressure.

ELEMENT NUMBER AND ELEMENTS USED IN THE DRAWINGS

Figure 1:
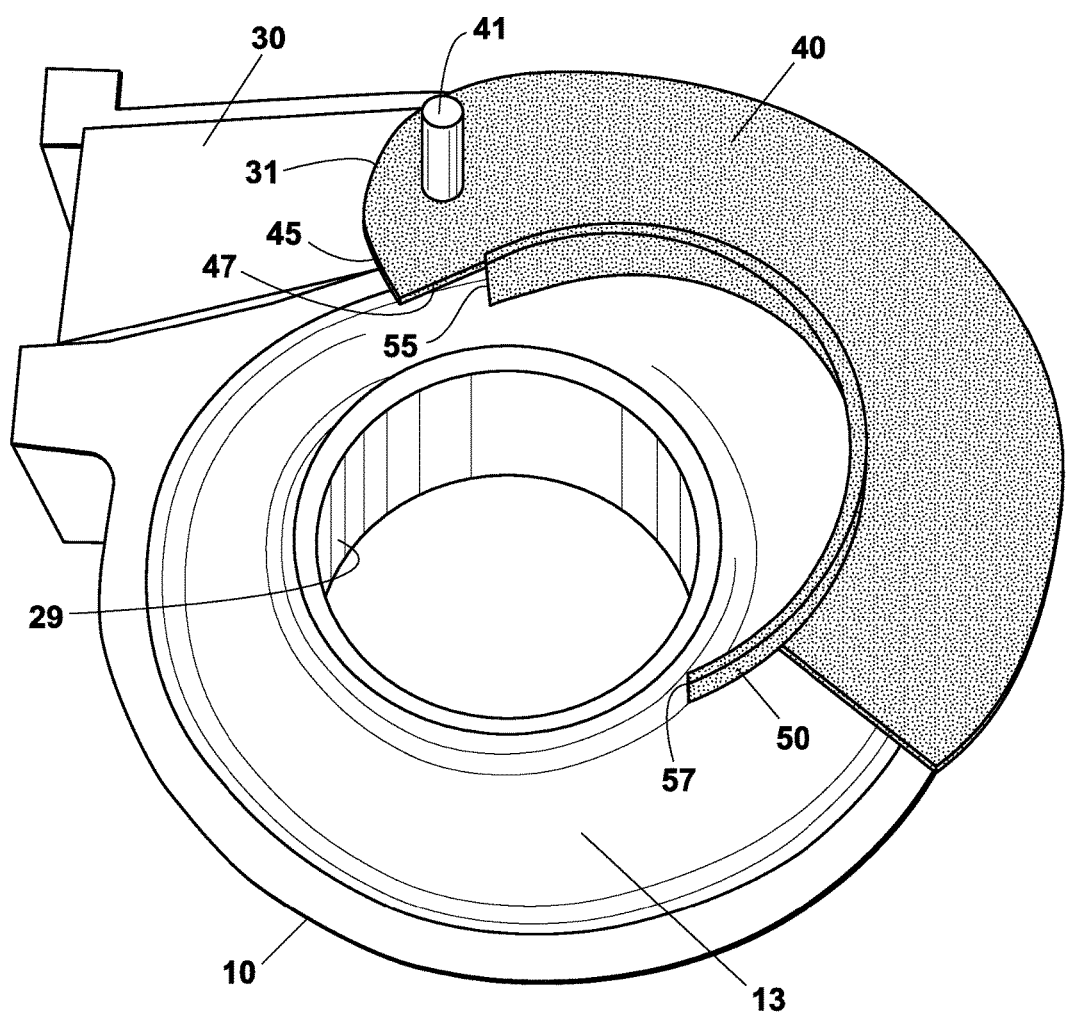
FIG. 1 is a cross section of a preferred embodiment of a turbocharger with progressively varying A/R ratio made according to this invention. The housing includes two dividers, one fixed, the other moveable. The fixed divider (or flow splitter) is located entirely within the inlet or throat section of the housing. The moveable (or pivoting) divider, which is shown in its fully open position, begins at the end of the fixed throat divider and then extends past the end of the tongue. The moveable divider includes pivot means for allowing it to move between the fully open and fully closed position and includes a volute slot blocker or vane attached to its lower end (and outside of the original inlet or throat section of the housing). A secondary housing (not shown) and covers the divider and prevents exhaust gas from escaping the turbocharger housing.

10 Housing
11 Inlet passageway or throat section
12 Extended inlet passageway or throat section
13 Volute
15 Tongue
17 Tongue tip or end
19 Exhaust gas inlet side
21 Cross section of 11
23 Reduced cross section downstream of 11
25 Volute slot above turbine inducer or wheel
27 Wall
29 Turbine inducer or wheel area
30 Fixed divider or vertical wall (flow splitter)
31 Downstream end of 30
40 Moveable divider or vertical wall
41 Pivot shaft
45 Upstream end of 40
47 Lower end of 40
50 Volute slot blocker or vane
53 Pivot arm
55 Upstream end of 50
57 Downstream end of 50
60 Fully closed position
65 Neutral position
70 Fully opened position

DETAILED DESCRIPTION OF THE PREFERRED EMBODIMENTS

Figure 2:
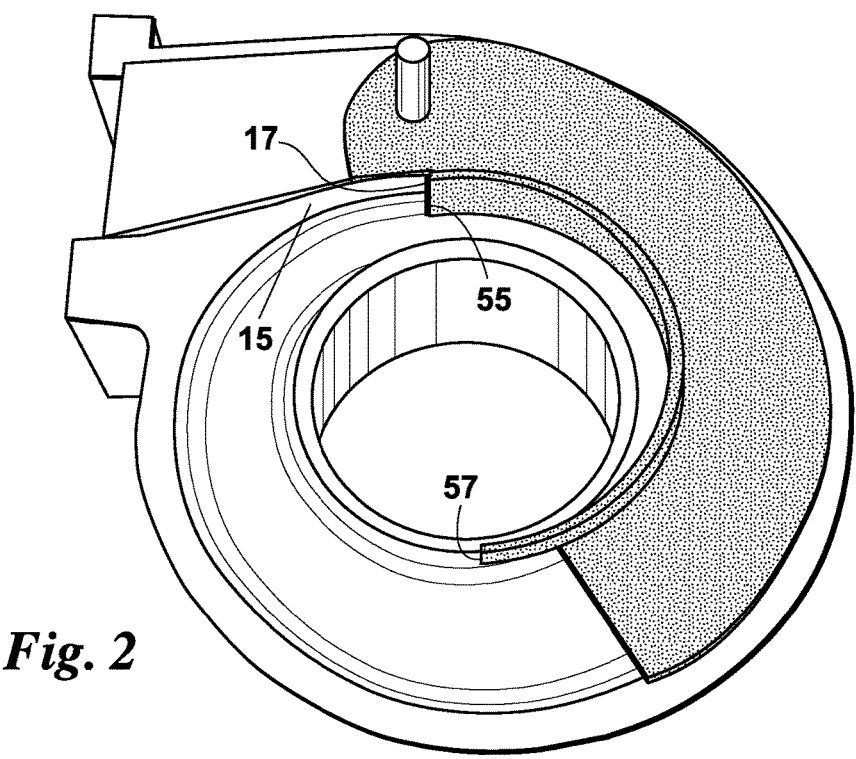
FIG. 2 is a cross-section of the turbocharger of FIG. 1 with the moveable divider shown in the fully closed position. In the fully closed position, the upstream end of the volute slot blocker or vane meets up with the tongue end of the housing, thereby altering the A/R ratio by extending the tongue to the downstream end of the vane.

Referring to the drawings, and first to FIGS. 1 and 2, a preferred embodiment of a turbocharger with an adjustable or progressively variable A/R ratio made according to this invention includes a housing 10 having two vertical walls or dividers of fixed length, one non-moveable or fixed 30, the other moveable 40. The fixed divider or flow splitter 30 is located entirely within the inlet or throat section 11 of the housing 10 and preferably has an arcuate (concave-shaped) downstream end 31 or, alternatively, a straight end (not shown). The moveable (or pivoting) divider 40, which is shown in its fully opened position in FIG. 1, begins at the downstream end 31 of the fixed divider 30 and then extends past the end 17 of the tongue 15.

Housing 10 is a radial inflow housing, meaning that the housing 10 has a volute 13 that continuously decreases in area and cross section to help maintain even pressure all the way around the turbine inducer or wheel area 29. The inlet or throat section 11 of the housing 10 begins at the exhaust inlet side 19 and extends to the end 17 of the tongue 15. This invention effectively extends that original throat section 11 further downstream in the volute 13 to an area of reduced cross section 23 relative to that of the original or unaltered throat cross section 21 (see FIG. 7 showing cross section 21 being defined by a cutting plane line that passes through the inlet passageway or throat section 11 at the tip or end 17 of the tongue 15 to the opposing wall 27 of the inlet passageway 11 and cross section 23 being farther downstream defining an extended throat section 12).

Figure 7:
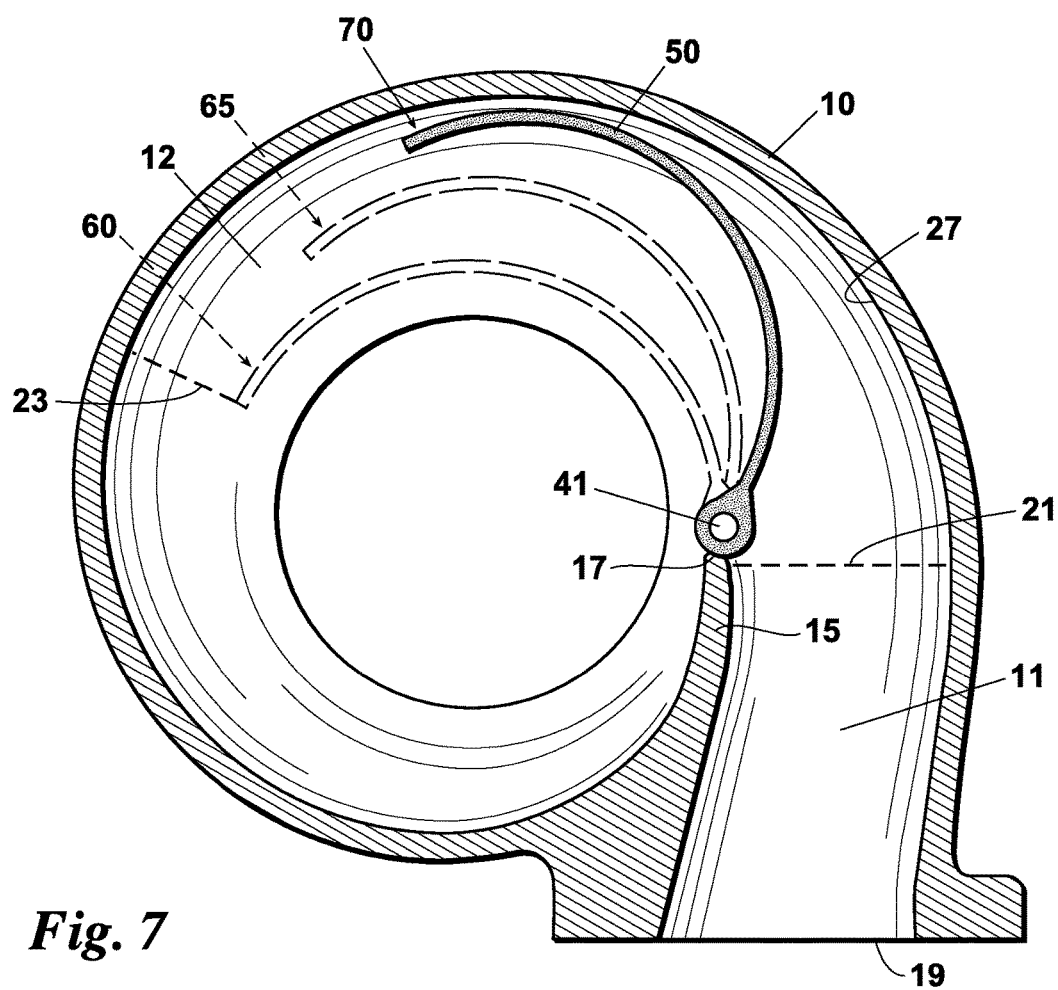
FIG. 7 is a cross section of another preferred embodiment of a turbocharger with progressively varying A/R ratio made according to this invention. A volute slot blocker, shown in its open position here and arranged at the downstream end of the tongue, pivots downward toward the turbine wheel and effectively moves the end of the tongue (and, therefore, the inlet or throat section) further downstream to a place of reduced cross sectional area, thereby resulting in a reduced A/R ratio.

The moveable divider 40 includes pivot means for allowing it to move between the fully open and fully closed positions 70, 60 (see e.g. FIG. 7). The pivot means is preferably a shaft 41 in communication with electrical or pneumatic control means of a kind known in the art (see e.g., U.S. Pat. No. 7,481,056 to Blaylock, the contents of which is hereby incorporated by reference). The control means is sized to withstand and overcome any backpressure exerted by the divider 40 and vane volute slot blocker or vane 50 (discussed below) when moving between the closed and open positions 60, 70.

The shaft 41 is not in contact with the upper wall 27 of the housing 10 but rather is arranged at the horizontal center line of the throat section 11. The upstream end 45 of the divider 40 preferably has an arcuate (convex) forward end or straight end complementary in shape to the fixed splitter's downstream end 31.

The moveable divider 40 also includes a rigid (non-flexible), volute slot blocker or vane 50 attached to the lower end 47 of the divider 40. The upstream end 55 of the vane 50 begins at the end 17 of the tongue 15.

When the moveable divider 40 is in the fully open position, the A/R ratio of the housing 10 remains unchanged. The divider 40 opens up the volute 13 and provides a single volute design to the housing 10, with exhaust gas flow flowing between the end 17 of the tongue 15 and the upstream end 55 of the vane 50 (and therefore under and over the vane 50) until it eventually flows into the turbine inducer or wheel area 29.

When the moveable divider 40 is in the fully closed position, the upstream end 55 of the volute slot blocker or vane 50 meets up with the end 17 of the tongue 15, and the moveable divider 40 provides a dual volute 13 housing 10. The A/R ratio is altered because the tongue end 17 (and therefore the inlet passageway or throat section 11) has been extended by the vane 50 toward the downstream end 57 of the vane 50.

This extension effectively brings the tongue end 17 to a place of reduced cross sectional area 23 relative to the original inlet or throat cross sectional area 21, thereby resulting in a reduced A/R ratio. For example, when in the closed position, the vane 50 turns a 0.88 A/R turbine housing (i.e., a housing with the vane 50 in a fully retracted position or a housing without the vane 50) into a 0.40 A/R turbine housing.

As the moveable divider 40 and volute slot blocker or vane 50 move to intermediate positions (e.g. 65) between the fully opened and fully closed positions 60, 70, the A/R ratio is progressively varied. Using the above example, the A/R ratio can progressively vary between 0.88 and 0.40. However, the length of the vane 50 can be any length that provides a desired A/R ratio when the vane 50 is in the fully closed position 60 yet still clear the turbine inducer or wheel area 29 when moving into the fully opened position 70, with shorter lengths being less effective than longer lengths.

When the movable divider 40 is in its fully open position, the divider 40 extends beyond the original housing 10. A secondary housing (not shown) is needed to cover the divider 30 and prevent exhaust gas from escaping the housing 10.

Figure 3:
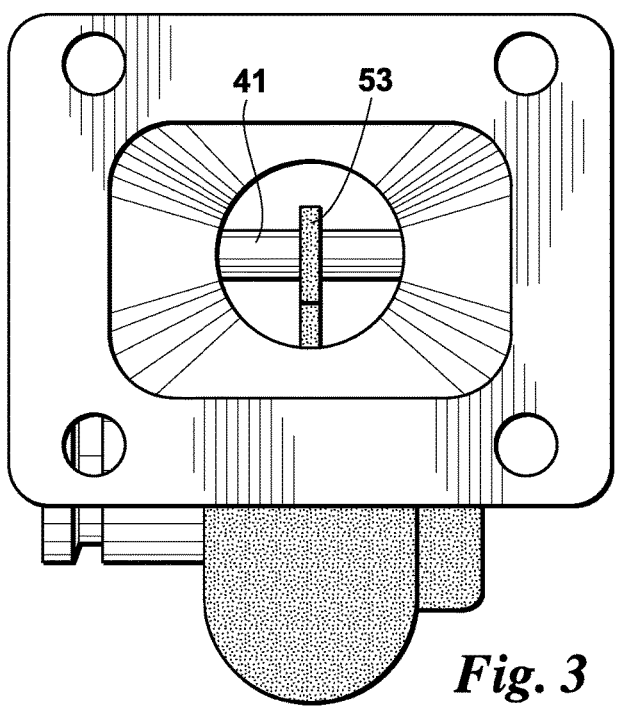
FIG. 3 is an end view of the throat or inlet section to the turbocharger fitted with the volute slot blocker or vane of FIG. 4. The pivot means are located at the horizontal centerline of the inlet above the tongue end.
Figure 4:
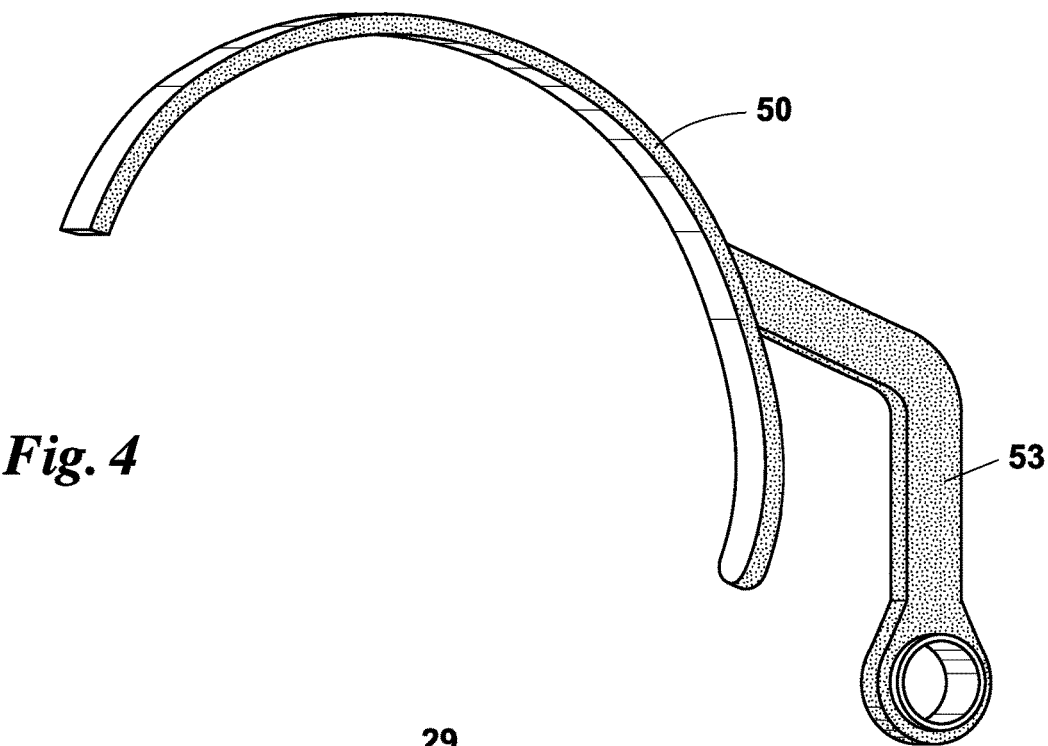
FIG. 4 is an isometric view of an alternate embodiment of the volute slot blocker or vane. The moveable divider wall of FIG. 1 has been eliminated along with the fixed divider.
Figure 5:
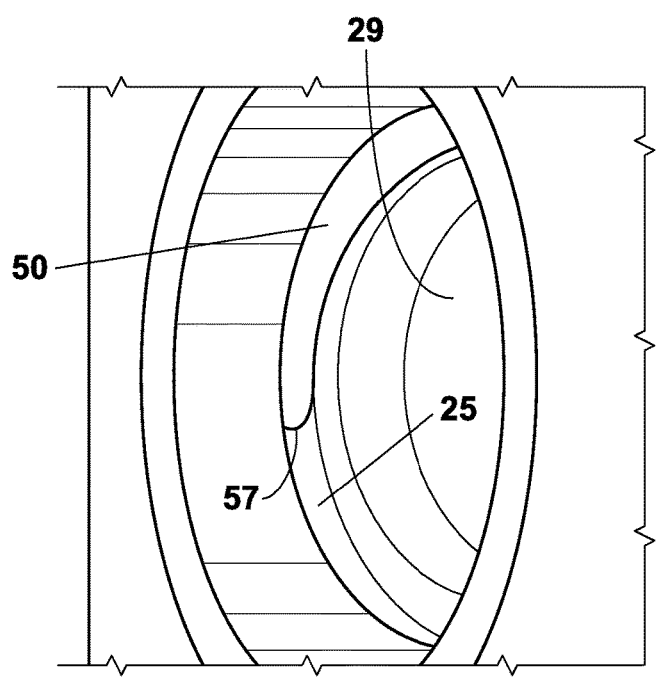
FIG. 5 is a view of the vane of FIG. 4 in its closed position. The vane preferably blocks the first 180° degrees of the volute slot. The vane could extend past 180° but anything more than 185° would require additional means to pivot the vane away when moving toward the open position and still clear the turbine wheel housing.
Figure 6:
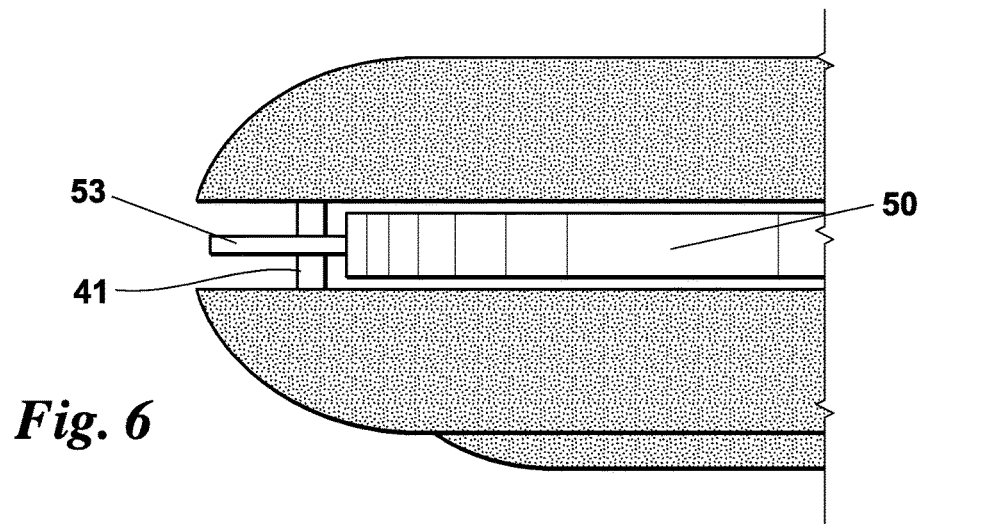
FIG. 6 is a top view of the vane of FIG. 4 with a portion of the housing cut away to show the vane.

Referring now to FIGS. 3-6, an alternate preferred embodiment of a turbocharger with an adjustable or progressively variable A/R ratio made according to this invention includes a housing 10 having the volute slot blocker or vane 50 of fixed length without the fixed and moveable dividers 20, 40 of FIGS. 1-3. Similar to that other embodiment, vane 50 preferably blocks the first 180° degrees of the volute slot 25 when the vane 50 is in the fully closed position (see e.g., FIG. 5). The pivot shaft 41 is located at the horizontal centerline of the inlet or throat section 11 above the downstream end 17 of the tongue 15. Preferably, the vane 50 is arranged such that exhaust gas flow passing over the downstream end 57 of the vane 50 is prevented from passing between the vane 50 and where it meets the downstream or tip end 17 of the tongue 15 (see e.g., FIGS. 12A-13B).

Animations show that leaving the inlet 11 unobstructed by the shaft 41 (and arm 53) produces a much smoother flow of exhaust gas in the volute 13, through the slot 25 and into the turbine inducer or wheel area 29 (see FIGS. 12A-13B, the arrows showing the flow, the line weight of the arrows indicating velocity, with the line weight increasing as velocity increases; note the flow exits the turbine wheel but is not illustrated). Also, placing shaft 41 in the center of the inlet creates backpressure, even if knifing means (not shown) are placed upstream of it. Ideally, the backpressure-to-boost ratio is about 1:1.

Figures 8, 9:
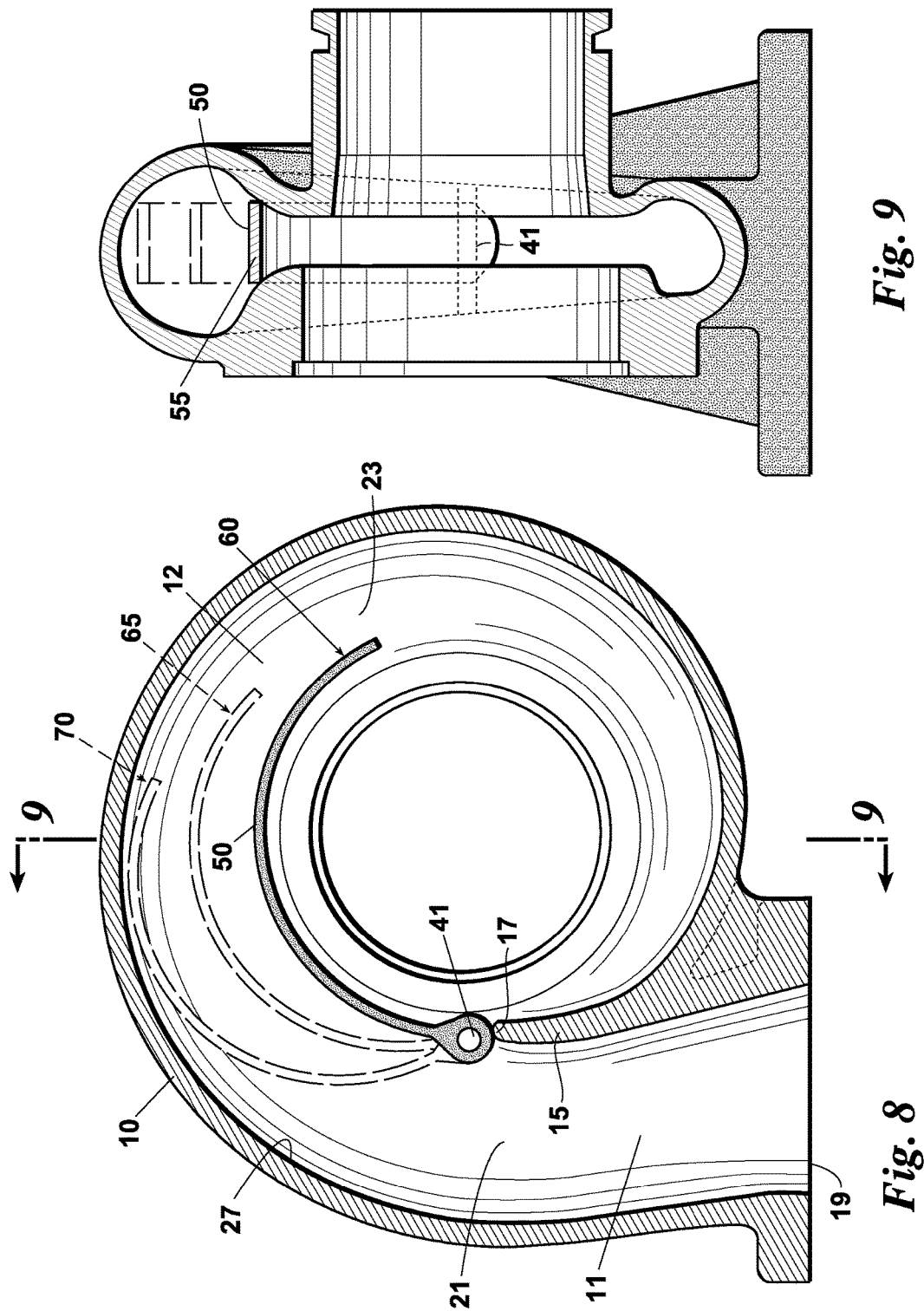
FIG. 8 is a cross section of the turbocharger of FIG. 6, with the volute slot blocker in its fully closed position.
FIG. 9 is an end view of the throat or inlet section to the turbocharger taken along section line 9-9 of FIG. 8. The pivot means are located at the downstream end of the tongue, thereby not obstructing the original throat or inlet section area (compare FIG. 3).

Therefore, in the embodiment of FIGS. 7-9, the pivot shaft 41 is located below the inlet cross sectional area 21 so that the shaft 41 does not obstruct the inlet cross sectional area 21 at any time. The pivot point or shaft 41 does not contact the upper wall 27. Preferably, only a single pivot shaft 41 is used in this and the other embodiment. Also preferably the vane 50 is arranged such that exhaust gas flow passing over the downstream end 57 of the vane 50 is prevented from passing between the vane 50 and where it meets the downstream or tip end 17 of the tongue 15 (see e.g., FIGS. 12A-13B).

Additionally, the angled pivot arm 53 in the embodiment of FIGS. 3-6 has been eliminated. The upstream end 55 of the vane 50 is attached at the end 17 of the tongue, which permits the vane to close the first 180° of the slot 25 completely (and also makes the vane stronger compared to a design which places the pivot point at a min-point of the vane). Preferably, the upstream end 55 is set lower or deeper relative to the volute slot 25 than is the downstream end 57 of the vane 50. In a preferred embodiment, the upstream end 55 was set about ⅛ inch (0.317 cm) lower than the downstream end 57.

Vane 50 can be sized such that it can be received by the volute slot 25 yet still block flow into the slot 25 (e.g., ½ inch (1.27 cm)) or can be sized wider than the slot 25. Making vane 50 wider than slot 25 serves to raise the vane 50 higher in the volute 13, thereby decreasing the cross-sectional area above the vane 50. The same holds true for the other preferred embodiments The fully open position 70 is above the full intermediate or neutral position 65 which, in turn, is above the fully closed position 60 (see FIGS. 7 & 8). The neutral position 65 essentially splits or defines volute 13 into an upper and lower half, with an equal volume of exhaust flowing over and under the vane 50. The vane 50 can pivot from any one of those positions 60 65, 70 to another as well as any position in between each of those. As the volute slot blocker or vane 50 pivots downward from the open position 70 toward the turbine inducer or wheel areaa 29, the vane 50 effectively moves the tongue end 17 (and, therefore, the inlet or throat section 11) further downstream to a place of reduced cross sectional area 23, thereby resulting in a reduced A/R ratio. When in any position other than the fully open position 70, the A/R ratio of the turbocharger is altered.

When vane 50 is in the closed position, tests showed a 3,000 RPM increase in turbine wheel speed at idle. By way of comparison, the Blaylock moveable vane, discussed in the Background section, shows a 500 RPM increase at idle. A reason for this is the Blaylock moveable vane cannot close off flow to the turbine wheel completely. Vane 50 can close off the flow to 180° of the slot 25. Similar to the other preferred embodiments, the length of the vane 50 can be any length that provides a desired A/R ratio when the vane 50 is in the fully closed position 60 yet still clear the turbine wheel when moving into the fully opened position 70, with shorter lengths being less effective than longer lengths.

Figure 10:
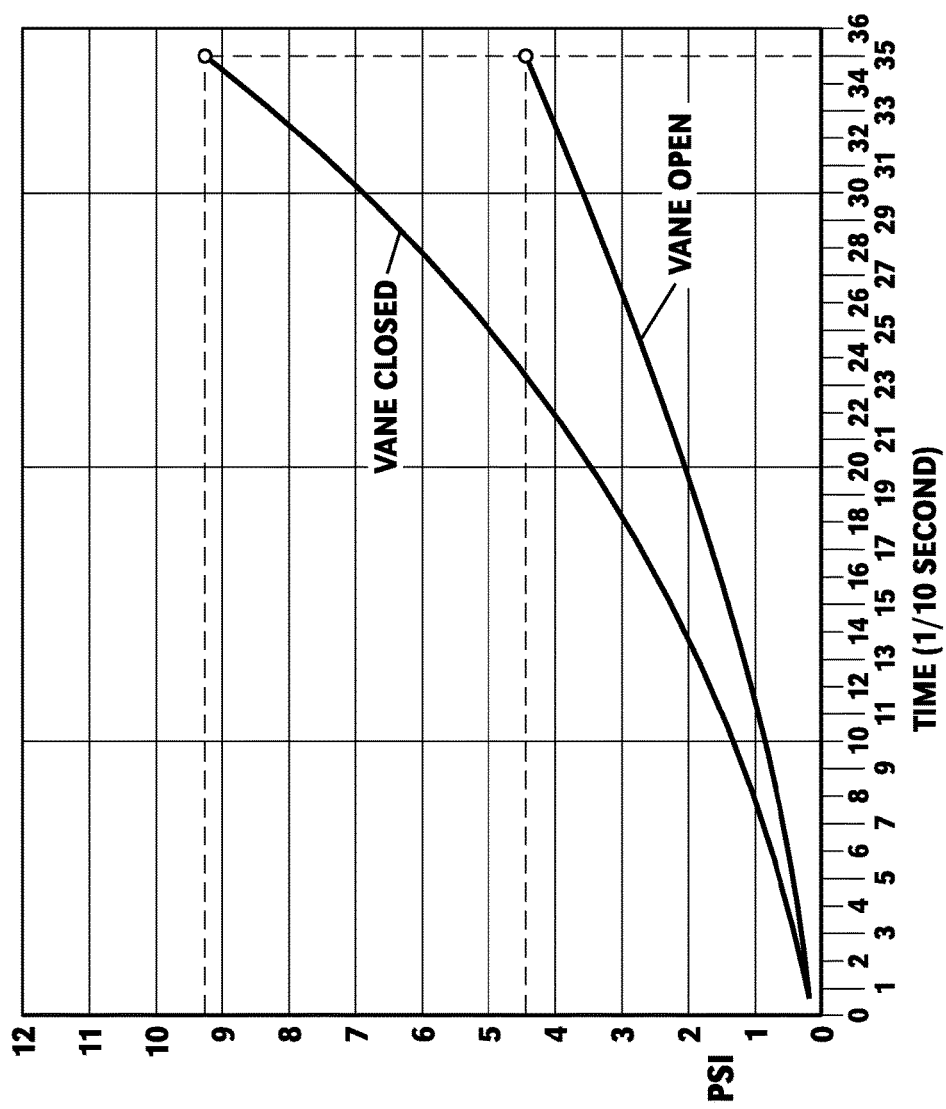
FIG. 10 is a graph comparing the boost gain of a turbocharger fitted with the embodiment of FIGS. 6-8. with and without the volute slot blocker.
Figure 11:
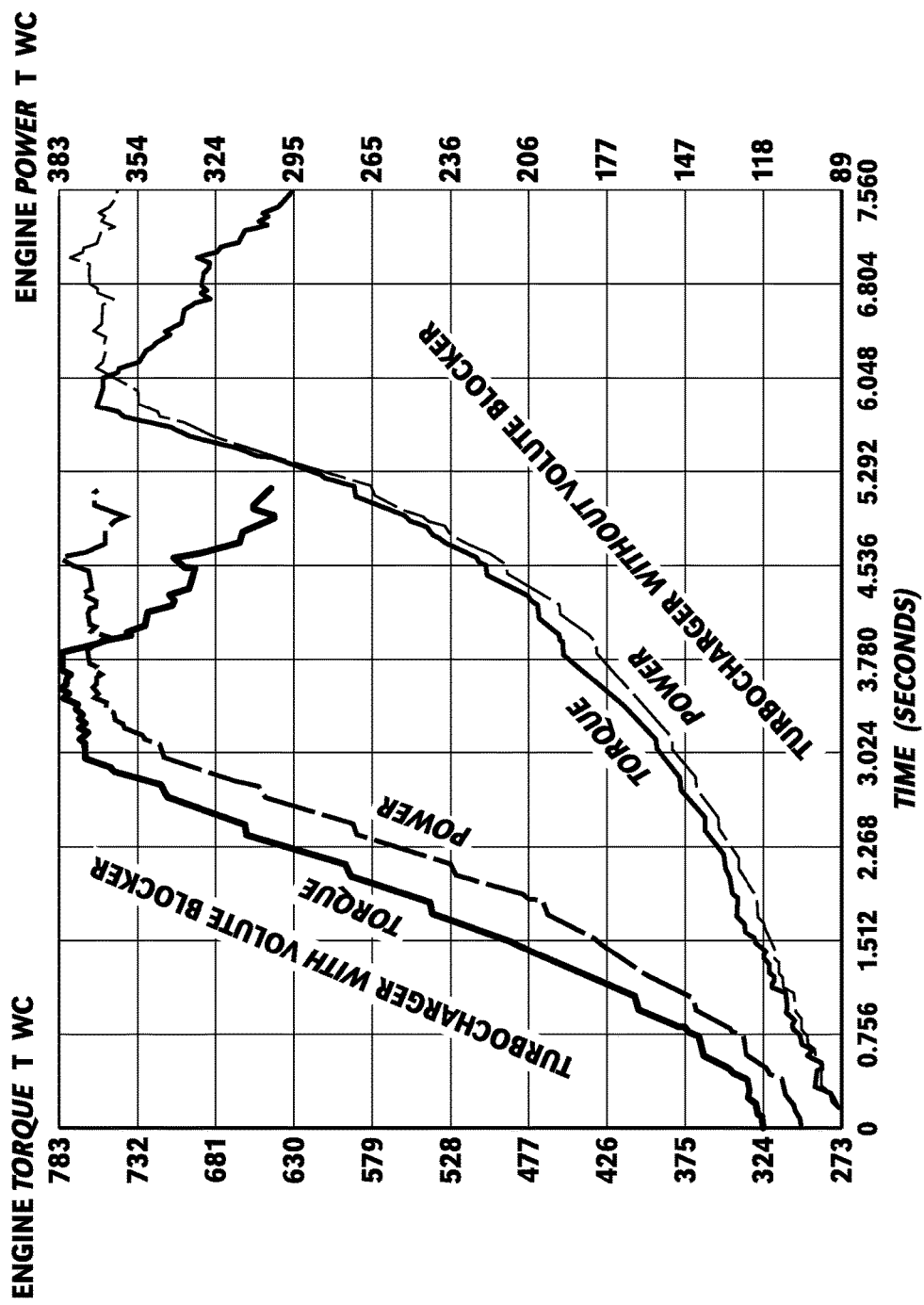
FIG. 11 is a graph comparing a dynamometer run of the same turbocharger with and without the volute slot blocker of FIGS. 6-8. The turbocharger with the volute slot blocker makes more power and achieves peak power about 2 seconds faster.
Figure 12A:
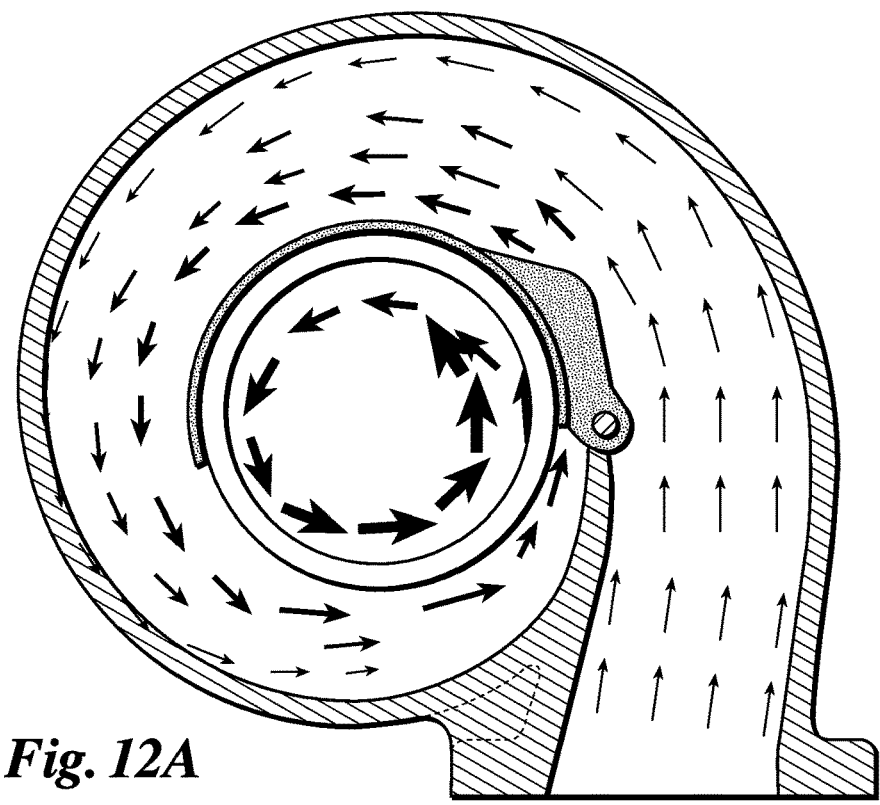
FIG. 12A is an animation illustrating exhaust air flow as it flows from the exhaust air inlet to the wheel with the vane closed and the pivot point of the vane not obstructing the initial inlet throat area.
Figure 12B:
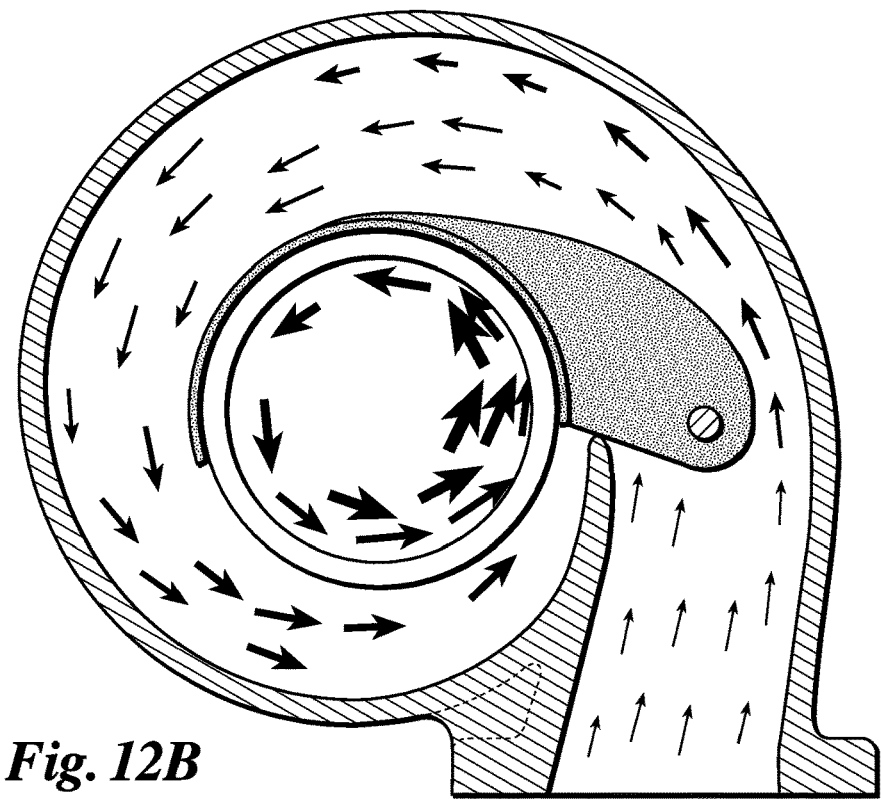
FIG. 12B is an animation illustrating the exhaust air flow when the pivot point of the vane is arranged at the centerline of the initial throat area.
Figure 13A:
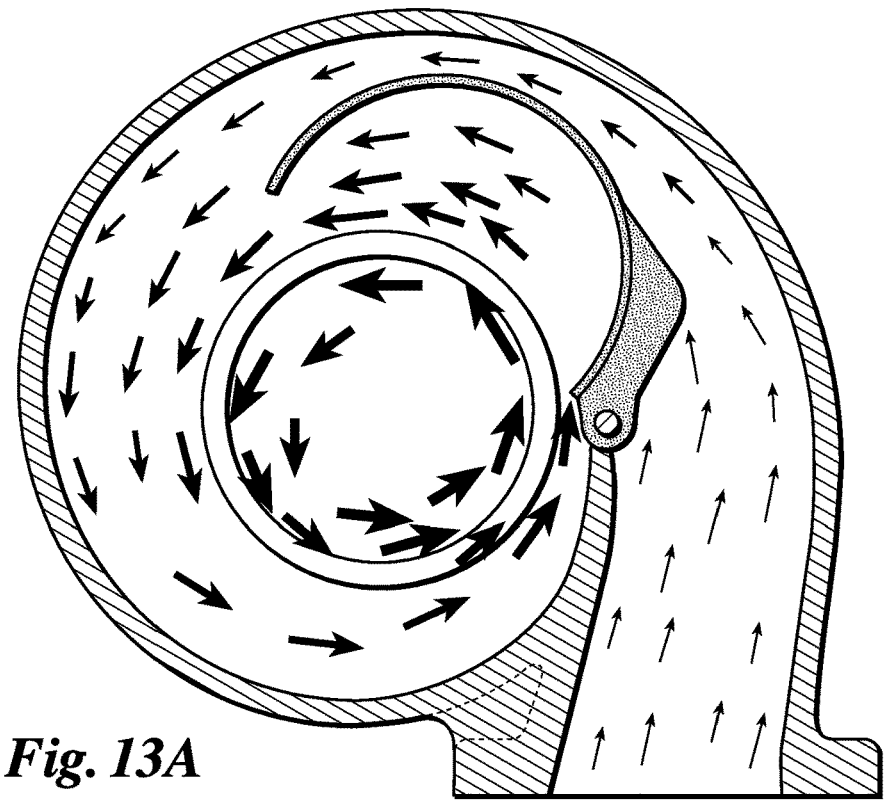
FIG. 13A is an animation illustrating the vane arrangement of FIG. 12A when the vane is opened at about 40° (as measured from the 180° point of the volute slot).
Figure 13B:
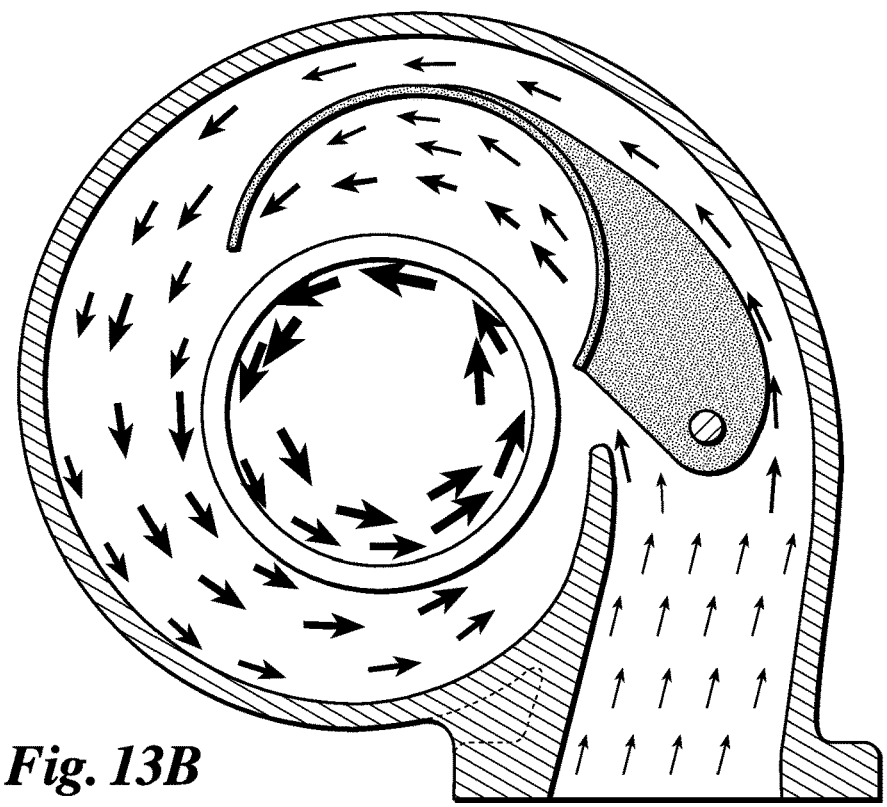
FIG. 13B is an animation illustrating the vane arrangement of FIG. 12B when the vane is opened at about 25°.

FIG. 10 shows the boost gain of a turbocharger without a volute slot blocker and the same turbocharger fitted with the embodiment of FIGS. 4-8. FIG. 11 compares a dynamometer run of the same turbocharger with and without the volute slot blocker 50. The turbocharger with the volute slot blocker 50 makes more power and achieves peak power about 2 seconds faster.

While preferred embodiments of the turbocharger have been described, the invention itself is defined by the following claims.

What is claimed is:

1. A turbocharger comprising:
    a housing (10) defining a volute slot (25) located along a midline of an inner periphery of the housing (10) above a turbine wheel (29);
    a tongue (15) including a downstream end (17) defining an end of an initial inlet throat area (11/21) of the housing (10);
        a vane (50) located above and co-aligned with the volute slot (25) and including an upstream end (55) located at a downstream end (17) of the tongue (15);
        means for pivoting (41) the vane (50) between a fully closed (60), a neutral (65), and a fully opened position (70), the pivot means (41) arranged at the downstream end (17) of the tongue (15) and the upstream end (55) of the vane (50);
        a downstream end (57) of the vane (50) defining a second inlet throat area (23) having a same cross-sectional area as the initial inlet throat area (11/21) when the vane (50) is in the fully opened position and a reduced cross-sectional area when the vane (50) is in the fully closed position;
    wherein when the vane (50) is in the fully opened position (70), the downstream end (57) of the vane (50) is adjacent an outer wall (27) of the housing (10) and the volute slot (25) is unobstructed by the vane (50) and inlet exhaust gas which flows into the initial inlet throat area (11/21) first enters the volute slot (25) at the downstream end (17) of the tongue (15); and
    wherein when the vane (50) is in the fully closed position (60), the downstream end (57) of the vane is adjacent the turbine wheel (29) and the volute slot (25) is blocked by the vane (50) up to the downstream end (57) and the inlet exhaust gas which flows into the initial inlet throat area (11/21) and the second inlet throat area (23) first enters the volute slot at the downstream end (57) of the vane (50).

2. A turbocharger according to claim 1 wherein the area/radius ratio of the housing (10) progressively varies as the vane (50) pivots between the fully opened (70) and fully closed positions (60).

3. A turbocharger according to claim 1 wherein in the fully opened position (70) the flow of the inlet exhaust gas is unevenly distributed above and below the vane (50).

4. A turbocharger according to claim 1 wherein the overall length of the vane 50 is sized to provide a predetermined area/radius ratio of the turbocharger when the vane (50) is in the fully closed position (60) yet still clear the turbine wheel (29) when moving into the fully opened position (70).

5. A turbocharger according to claim 1 wherein when the vane (50) is in the fully closed position (60) the downstream end (57) of the vane (50) extends to 180° of the volute slot (25).

6. A turbocharger according to claim 1 wherein the vane (50) is wider than the volute slot (25).

7. A turbocharger according to claim 1 wherein the upstream end (55) of the vane (50) is at a different height relative to the slot (25) than is the downstream end (57) of the vane (50).

8. A turbocharger according to claim 1 further comprising a vertical divider wall (40) located above and attached to the vane (50).

9. A turbocharger according to claim 8 wherein when the vane (50) is in the fully closed position (60), the vertical divider wall (40) defines a first and a second volute (13) of the housing (10).

10. A turbocharger according to claim 1 further comprising a vertical divider wall (40) located in the initial inlet throat area (11) of the housing (10), upstream of an upstream end (55) of the vane (50).

11. A turbocharger according to claim 1 wherein the pivot means (41) does not obstruct the flow of inlet exhaust gas flowing through the initial inlet throat area (11) of the housing (10).

12. A turbocharger according to claim 1 wherein the vane (50) is a fixed length.

13. A turbocharger according to claim 1 wherein the vane (50) is a rigid vane.

* * * * *